United States Patent
Mastie et al.

(10) Patent No.: US 6,883,706 B2
(45) Date of Patent: Apr. 26, 2005

(54) POINT-OF-SALE BILL AUTHENTICATION

(75) Inventors: Scott D. Mastie, Longmont, CO (US); Joan L. Mitchell, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/430,025

(22) Filed: May 5, 2003

(65) Prior Publication Data

US 2004/0222283 A1 Nov. 11, 2004

(51) Int. Cl.⁷ ............................................. G06F 17/60
(52) U.S. Cl. ..................... 235/379; 235/385; 235/435; 235/375; 902/8; 902/10; 705/43; 705/44; 705/16; 340/5.86
(58) Field of Search ............................... 235/379, 385, 235/435, 375; 902/7, 8–16; 382/135; 209/534; 73/159, 163; 194/206, 207; 705/39–45, 16; 340/5.86, 5.9

(56) References Cited

U.S. PATENT DOCUMENTS

| | | | |
|---|---|---|---|
| 4,745,267 A | | 5/1988 | Davis et al. |
| 4,897,875 A | | 1/1990 | Pollard et al. |
| 5,191,613 A | | 3/1993 | Graziano et al. |
| RE34,954 E | | 5/1995 | Haber et al. |
| 5,469,557 A | * | 11/1995 | Salt et al. ..................... 711/103 |
| 5,493,613 A | | 2/1996 | Denno et al. |
| 5,607,040 A | * | 3/1997 | Mathurin, Sr. .............. 194/207 |
| 5,701,343 A | | 12/1997 | Takashima et al. |
| 5,748,742 A | | 5/1998 | Tisdale et al. |
| 5,809,144 A | | 9/1998 | Sirbu et al. |
| 5,909,492 A | | 6/1999 | Payne et al. |
| 5,915,022 A | | 6/1999 | Robinson et al. |
| 5,917,913 A | | 6/1999 | Wang |
| 6,065,672 A | * | 5/2000 | Haycock ..................... 235/379 |

(Continued)

FOREIGN PATENT DOCUMENTS

| | | |
|---|---|---|
| EP | 1030505 A2 | 8/2000 |
| JP | 11-252069 | 9/1999 |
| WO | WO 0045549 | 8/2000 |
| WO | WO 0111843 A1 | 2/2001 |

OTHER PUBLICATIONS

IBM Technical Disclosure Bulletin, vol. 34, No. 6, "Credit Card Imaging System", Nov. 1991, pp. 152–153.
ISSN: 1361–3723, "Computer Fraud & Security", Apr. 1997, pp. 10–13.
Prevelakis et al., "Controlling the Dissemination of Electronic Documents", Swiss Federal Government by the SPP–ICS, 1996–1998 project "HyperNews", (Project No. 5003–045333).
Wang et al., "Fast Retrieval of Electronic Documents in Digital Libraries (Extended Abstract)", 1995, pp. 208–215.

*Primary Examiner*—Karl D. Frech
*Assistant Examiner*—Daniel Walsh
(74) *Attorney, Agent, or Firm*—Scott W. Reid; Hoffman, Warnick & D'Alessandro LLC (57) ABSTRACT

The invention includes systems, methods and program products for providing real-time point-of-sale paper currency, i.e., bill, authentication and recordation. The invention provides a point-of-sale terminal capable of real-time authentication and recordation of paper currency, a currency monitoring system for tracking paper currency usage and conducting paper currency authentication relative to a currency issuing entity's database, and a reconciliation system for reconciling a point-of-sale terminal.

25 Claims, 4 Drawing Sheets

U.S. PATENT DOCUMENTS

| | | | |
|---|---|---|---|
| 6,131,162 A | 10/2000 | Yoshiura et al. | |
| 6,131,718 A * | 10/2000 | Witschorik | 194/206 |
| 6,185,683 B1 | 2/2001 | Ginter et al. | |
| 6,219,788 B1 | 4/2001 | Flavin et al. | |
| 6,243,480 B1 | 6/2001 | Zhao et al. | |
| 6,260,145 B1 | 7/2001 | Komura et al. | |
| 6,279,112 B1 | 8/2001 | O'Toole, Jr. et al. | |
| 6,299,062 B1 | 10/2001 | Hwang | |
| 6,307,955 B1 | 10/2001 | Zank et al. | |
| 6,308,277 B1 | 10/2001 | Vaeth et al. | |
| 6,327,656 B1 | 12/2001 | Zabetian | |
| 6,330,549 B1 | 12/2001 | Merkle | |
| 6,550,671 B1 * | 4/2003 | Brown et al. | 235/379 |
| 2001/0032878 A1 | 10/2001 | Tsiounis et al. | |
| 2001/0037313 A1 | 11/2001 | Lofgren et al. | |
| 2001/0037454 A1 | 11/2001 | Botti et al. | |
| 2002/0004902 A1 | 1/2002 | Toh et al. | |
| 2002/0010640 A1 | 1/2002 | Dutta et al. | |
| 2002/0067846 A1 * | 6/2002 | Foley | 382/139 |
| 2003/0059098 A1 * | 3/2003 | Jones et al. | 382/135 |
| 2003/0132281 A1 * | 7/2003 | Jones et al. | 235/379 |
| 2003/0169899 A1 * | 9/2003 | Slepyan et al. | 382/100 |
| 2004/0024709 A1 * | 2/2004 | Yu et al. | 705/43 |
| 2004/0062430 A1 * | 4/2004 | Buntscheck | 382/135 |

\* cited by examiner

POINT-OF-SALE BILL AUTHENTICATION

BACKGROUND OF THE INVENTION

1. Technical Field

The present invention relates generally to document authentication, and more particularly, to point-of-sale paper currency, i.e., bill, authentication.

2. Related Art

Improved document reproduction techniques have made it possible to create near perfect duplicates. While these techniques are generally beneficial to society, they provide an unfortunate ability for counterfeiting of money (or cash) in the form of paper currency such as bills, notes, stocks, bonds, etc. One type of counterfeit paper currency that poses immediate danger to commerce is that of large denomination bills, e.g., US paper currency over $10. The entities most often damaged by counterfeit bills are merchants such as retailers, restaurateurs, etc. However, counterfeit paper currency also presents a number of problems for individuals and government.

In terms of merchants, some merchants minimize their exposure to the problem by avoiding large denomination bills. That is, they do not accept any bills above a certain denomination. This approach, however, is inconvenient to customers, which any merchant wants to avoid being. Other merchants take the approach of relying on the awareness of a point-of-sale terminal operator to detect fraudulent paper currency. Unfortunately, even the most aware terminal operator is incapable of detecting high quality, but fraudulent paper currency. Real-time credit card currency monitoring systems are ubiquitous in modem day commerce, but these systems do not extend to cash transactions. Paper currency transactions also pose a danger to merchants in terms of theft or disaster because, conventionally, no complete record of received bills ever exists. In these situations, lack of proof of bills received may result in an inability to track bills after theft and/or a denial of an insurance claim after a theft or a disaster.

Individuals may be cheated by fraudulent paper currency in the same manner as a merchant. Individuals, however, are oftentimes even less knowledgeable about fraudulent paper currency. The result is that individuals are also less prepared to address situations where they unknowingly receive and/or transmit fraudulent paper currency.

Government policing of fraudulent paper currency is also very difficult. For example, while the US and other governments are actively involved in fighting counterfeiting, policing activities are almost always post-transaction—after someone has been cheated. Again, a lack of a record of bills stolen prevents identification later.

In view of the foregoing, there is a need in the art for a way to provide real-time, paper currency authentication and recordation at a point-of-sale terminal.

SUMMARY OF THE INVENTION

The invention includes systems, methods and program products for providing real-time point-of-sale paper currency authentication and recordation. The invention provides a point-of-sale terminal capable of real-time authentication and recordation of paper currency, a currency monitoring system for tracking paper currency usage and conducting paper currency authentication relative to a currency issuing entity's database, and a reconciliation system for reconciling a point-of-sale terminal. The invention addresses a number of problems with the handling of paper currency at point-of-sale terminals.

First, the invention allows for automated bill authentication and/or fraud detection when a bill is presented as payment for purchase, analogous to the process currently available for credit-card purchases. From a merchant's perspective, automatically reducing fraud at a point-of-sale terminal removes the human error factor. In addition, a merchant's brand and customer perception may benefit from the increased security. From the individual's perspective, larger denomination bills are less likely to be denied, and the fraudulent paper currency unawareness problem is solved. In terms of policing, government authorities, such as the US Federal Reserve (or equivalent body in foreign markets), and banking institutions are provided with an automated tool to gather paper currency data such as serial numbers from presented bills at any point-of-sale terminal that uses the invention. This would include detection of fraudulent serial numbers, duplicate serial numbers, and "problem" serial numbers such as known stolen bills. Furthermore, bills that cannot be suitably read, due to wear/tear, writing, or other defacing, could also be rejected as unsuitable for use. Also, in the event of suspected illegal activity, bill(s) presented in a transaction can be held, and the police notified. From the police's perspective, this provides a strong deterrent to many cash crimes because passing counterfeit or stolen bills would be more difficult.

Second, the invention creates a precise bills record that can be useful in many ways. For example, a bills record from a point-of-sale terminal(s) (or an offsite backup facility, if records are kept offsite) provides a precise list of bills that were received at the time of a loss. In terms of a robbery, a bills record provides a mechanism for government authorities to track the bills. In terms of a loss due to robbery or, for example, a flood or fire, a bills record provides proof of bills received for insurance claims. In terms of flood or fire, if the bills record is integrated with an offsite backup (storage/retrieval) system, the invention may provide the only proof of bills for insurance claims. A bills record and related authenticating data may also be communicated to the currency monitoring system for authenticating and/or tracking. Tracking discourages the use of fraudulent bills in other transactions and increases the probability of catching and successfully prosecuting criminals. In addition, tracking allows government authorities (or trusted third parties) to actively fight counterfeit bills, by quickly detecting fraud, and removing counterfeit bills from circulation.

Third, the invention provides a reconciliation system for a point-of-sale terminal. The reconciliation system can be used to confirm bills are still present at a point-of-sale terminal (i.e., not lost or stolen).

A first aspect of the invention is directed to a method of authenticating a bill at a point-of-sale terminal, the method comprising the steps of: imaging a bill presented for payment at the point-of-sale terminal to create a bill image; conducting optical character recognition on the bill image to determine bill authenticating data; determining whether the bill is authentic in real-time by conducting at least one of: communicating the bill authenticating data to a currency monitoring system that evaluates bill authenticity, and awaiting an authentication response to the point-of-sale terminal; exposing the bill to ultraviolet light at the point-of-sale terminal to determine whether an authentication strip is present in the bill, wherein the authentication strip is illuminated by the ultraviolet light; determining, in the case that the authenticating data includes a plurality of bill serial numbers, whether the bill serial numbers match each other;

and determining a first denomination from the optical character recognition step and a second denomination from the authentication strip at the point-of-sale terminal, and determining whether the first and second denominations match.

A second aspect of the invention is directed to a point-of-sale terminal comprising: means for imaging a bill presented for payment at the point-of-sale terminal to create a bill image; means for determining bill authenticating data; means for authenticating the bill in real-time by communicating the bill authenticating data to a currency monitoring system that evaluates bill authenticity, and awaiting an authentication response to the point-of-sale terminal.

A third aspect of the invention is directed to a currency monitoring system for a bill received at a point-of-sale terminal, the system comprising: means for receiving authenticating data regarding the bill; and means for authenticating the bill by at least one of: verifying authenticity of a bill serial number; and verifying a bill denomination corresponds to the bill serial number.

A fourth aspect of the invention is directed to a system for reconciling a point-of-sale terminal, the system comprising: means for receiving a bill image of a bill received at the point-of-sale (POS) terminal; and means for reconciling the POS terminal by determining whether at least one of the bill image and a serial number of each bill imaged by POS terminal has a corresponding actual bill present at a specified time.

A fifth aspect of the invention is directed to a computer program product comprising a computer useable medium having computer readable program code embodied therein for authenticating a bill at a point-of-sale terminal, the program product comprising: program code configured to authenticate the bill in real-time by communicating bill authenticating data, obtained by conducting optical character recognition on an image of the bill, to a currency monitoring system, and awaiting an authentication response to the point-of-sale terminal.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

For purposes of clarity only, the following description includes the following headers: I. Paper Currency, Point-of-Sale Terminal Authentication Environment Overview; II. Point-of-Sale Terminal; III. Currency Monitoring System; IV. Reconciliation System; V. Operation; and VI. Conclusion.

I. Paper Currency, Point-of-Sale Terminal Authentication Environment Overview

Figure 1:
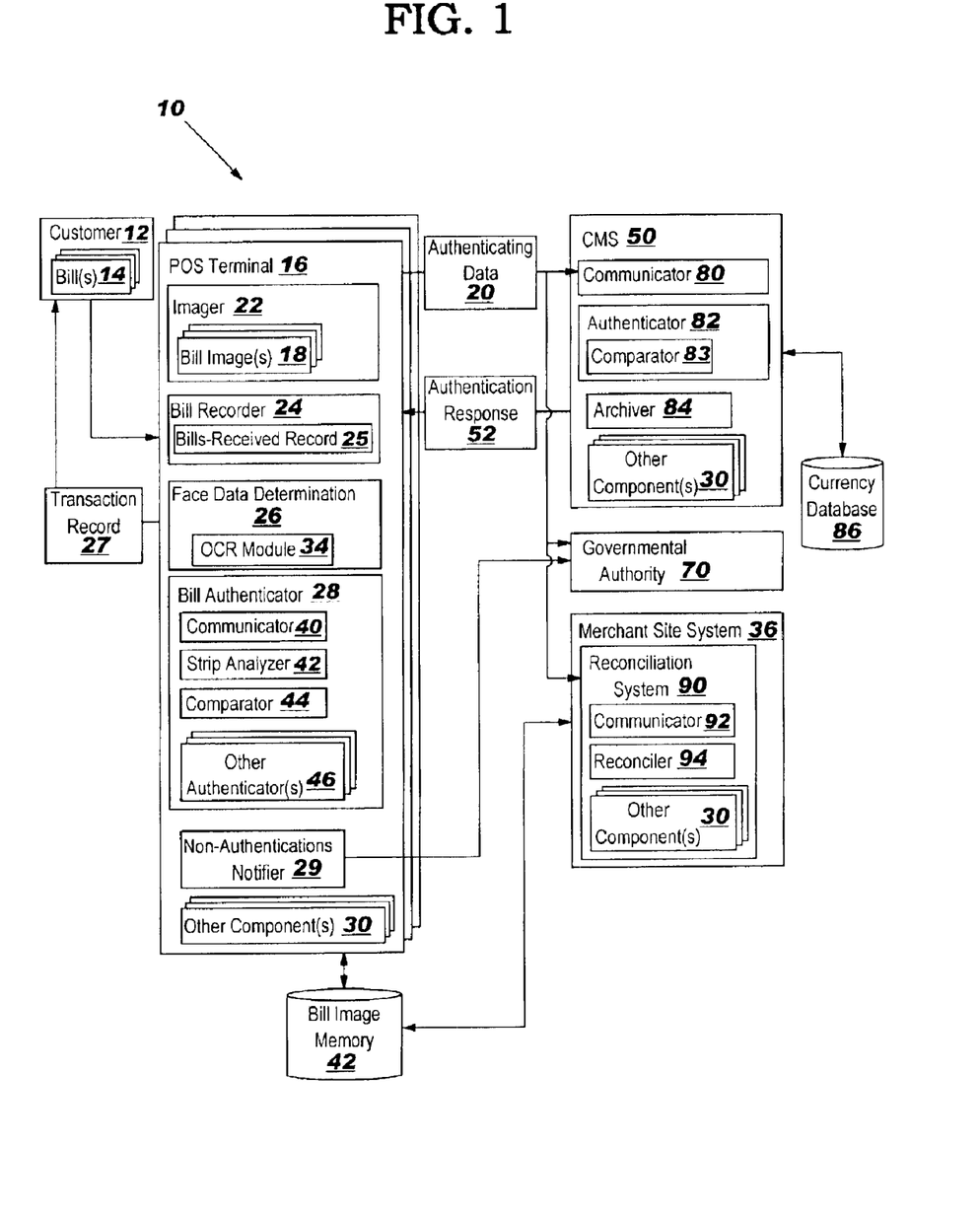
FIG. 1 shows a block diagram illustrating a bill, point-of-sale terminal authentication environment according to the invention.

With reference to the accompanying drawings, FIG. 1 is a block diagram of a paper currency, point-of-sale terminal authentication environment 10 in accordance with the invention. In this environment, a customer 12, having paper currency 14 (referred to hereinafter as a "bill" or "bills"), pays for some product(s) and/or service(s) at a point-of-sale terminal 16 (hereinafter "POS terminal 16"). As known in the art, customer 12 may approach POS terminal 16 and be waited upon by a POS terminal operator (not shown) who takes the customer's bills 14. Alternatively, in some instances, a customer 12 may be allowed to operate POS terminal 16. For example, POS terminal 16 may be provided as a device that automatically dispenses or accepts cash such as an unattended POS retail checkout system, an automated teller machine (ATM), or a vending machine. In another example, POS terminal 16 may be locations where money ordering service or money wiring services are offered, e.g., a post office, a Western Union® location, or other location offering such services. In any event, customer 12 pays for the product(s) and/or services by presenting bills 14, which are to be authenticated with POS terminal 16.

A general overview of authentication environment 10 will now be described—the details of operation will be described below. Authentication begins with POS terminal 16 imaging bill 14 to create a bill image 18. While the invention will be described relative to a single bill, it should be recognized that any number of bills 14 can be authenticated by the invention at any one time. Furthermore, it should be recognized that not every bill 14 presented for payment has to be authenticated. For instance, a merchant may choose to only authenticate large denomination bills, e.g., those larger than 20 US dollars. Next, bill image 18 has authenticating data 20 determined therefrom. "Authenticating data," as used herein, may include any bill 14 characteristic(s) generated by POS terminal 16, or other system(s), for use with authenticating functions. Authenticating data 20 is then used to determine the authenticity of bill 14 at POS terminal 16 and/or a currency monitoring system 50, as will be described in more detail below. In addition to bill authentication, the invention also includes mechanisms for retaining a record of bills. Further, the invention includes mechanisms for periodically reconciling POS terminal 16 by determining whether bill image(s) 18 of what is supposed to have been received by a POS terminal 16 matches those bill(s) 14 in the drawer (not shown) of POS terminal 16.

II. Point-of-Sale Terminal

As shown in FIG. 1, POS terminal 16 includes an imager 22, a bill recorder 24, a face data determinator 26, a bill authenticator 28, a non-authentication notifier 29 and other system components 30 used for conducting point-of-sale transactions. It should be recognized that while one POS terminal 16 has been illustrated, that a number of terminals 16 may exist within environment 10. For example, in a large retailer, a number of POS terminals 16 exist.

Figure 2:
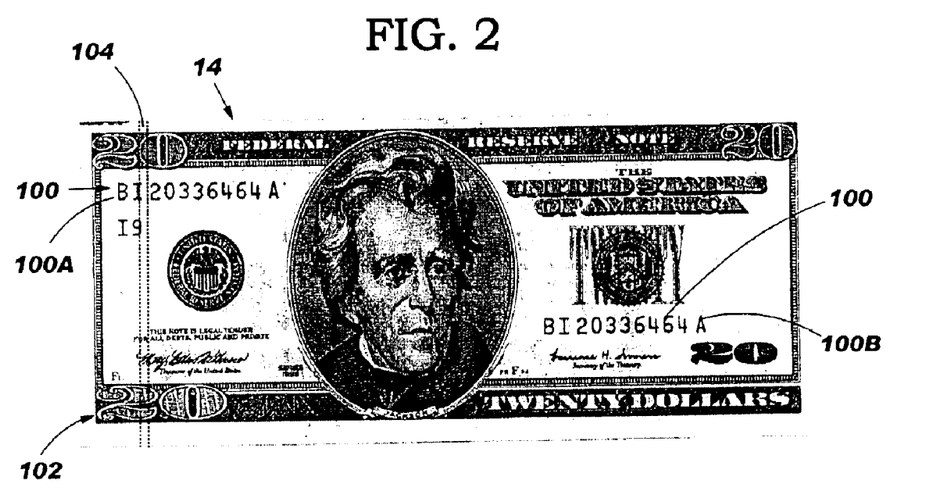
FIG. 2 shows a front image of an example bill in the form of a US 20 dollar bill for reference relative to operation of the invention.
Figure 3:
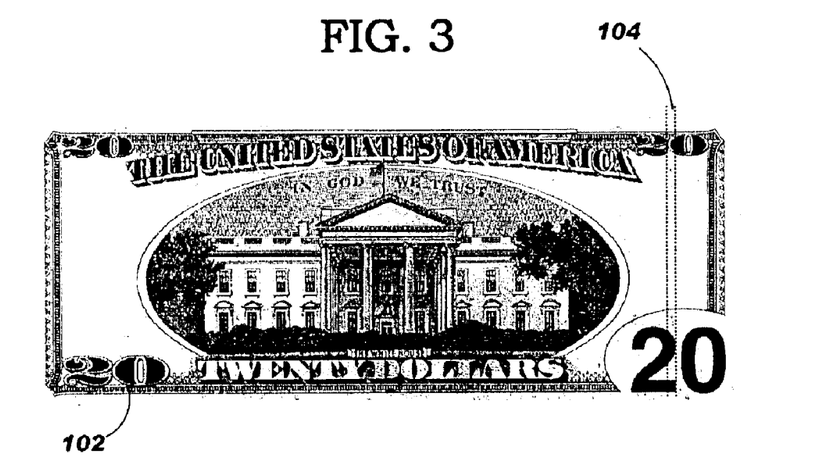
FIG. 3 shows a back image of the example bill of FIG. 2.

Imager 22 is configured to receive bill 14 and create at least one image 18, and preferably a front and back image, of bill 14 by scanning. The image(s) 18, parts thereof or processed portion(s) of the image(s) are referred to herein as "bill image(s)" 18. Referring to FIGS. 2 and 3, bill images 18 of a front of a bill 14 (FIG. 2) and a back of a bill 14 (FIG. 3) are shown. Bill image(s) 18 make up part of authenticating data 20, and may be stored in bill image memory 32 by bill recorder 24. Bill memory 32 may comprise any now known or later developed data storage system and/or transmission media, including magnetic media, optical media, random access memory (RAM), read only memory (ROM), a data object, etc., and may reside at a single physical location comprising one or more types of data storage, or be distributed across a plurality of physical systems. Imager 22 may be implemented as part of a check scanner as conventionally provided as part of POS terminal 16, or it may be a separate scanner.

Bill recorder 24, besides saving bill image(s) 18 to bill memory 32, may also implement formation of a bills record 25 and/or a discrete transaction record 27. Bills record 25 may include, for example, bill image(s) 18, bill serial number(s) 100 (FIG. 2) and/or other bill identifying matter of bills 14 received by POS terminal 16 during a defined time period. Transaction record 27 may include the same data for a discrete transaction for presentation to a customer 12, for example, on a paper receipt or an electronic receipt generated according to copending U.S. Ser. No. 10/430,824, entitled Point-of-Sale Electronic Receipt Generation, incorporated herein by reference. Images of checks presented for payment may also be made in this fashion. Bills record 25 provides proof of bills received after a robbery or loss for insurance claims purposes. In addition, record 25 provides a mechanism for tracking of bills received for the merchant by government authorities, as will be explained in more detail below. In terms of loss such as fire or flood, when memory 32 is located off-site from a merchant's business, it may provide the only record of bills received. In addition, the merchant may compare bills record 25 to a receiving bank institution's record, which would provide further confirmation of receipt by the banking institution and an additional deterrent to petty-theft by those making the deposits.

In an alternative embodiment, bills record 25 can be made accurate for all bills present at POS terminal 16 if bills given to customer(s) as change are also recorded. In order to achieve this accuracy, bills can be rescanned prior to being handed to a customer. In this case, POS terminal 16 drawers may be implemented similar to ATMs in that appropriate bills may be automatically dispensed without a POS terminal operator individually selecting the bills, and without opening the cash drawer. This makes scanning part of the automatic processing path in and out of the drawer. Since the bills are known to be authentic after entry into the drawer, they can be re-scanned to confirm which bills are exiting, but do not need to be re-authenticated. This saves time for the customer. The bills provided as change to a customer can also be included in transaction record 27.

Face data determinator 26 (hereinafter "FDD 26") is capable of conducting bill image processing to determine authenticating data 20 for a face of bill 14. As illustrated, in one embodiment, FDD 26 includes an optical character recognition (OCR) module 34. FDD 26 may also include any of a variety of image data-related processing modules for such things as: rotation correction, image aliasing correction, error corrections, magnetic ink character recognition (MICR), etc. Referring to FIG. 2, OCR module 34, in one embodiment, determines authenticating data 20 in the form of at least one serial number 100 and/or a face denomination 102 of bill 14. "Face denomination" 102 is that amount that is indicated on the surface (front or back) of bill 14. On certain currency issuing entities bills (e.g., US bills), a plurality of serial numbers 100A, 100B are provided, and may be ascertained as authenticating data 20 for purposes to be described below. In the bill 14 shown in FIG. 2, the serial number(s) are "BI 20336464 A" and the face denomination is $20. Although FDD 26 and OCR module 34 are shown as part of POS terminal 16, it should be recognized that either or both parts may be provided remote from POS terminal 16, e.g., at a merchant site system 36 such that a single FDD 26 and/or a single OCR module 34 may be provided for a number of POS terminals 16.

Bill authenticator 28 (hereinafter "authenticator 28") provides one or more mechanisms for checking the authenticity of bill 14. As will be discussed further, "authenticity," as used herein, can take a variety of forms. For example, authenticity may include an indication of a bill's state relative to counterfeiting, physical condition, theft and/or other parameters. In one embodiment, authenticator 28 may include: a communicator 40; a strip analyzer 42; a comparator 44; and other authenticator(s) 46.

Communicator 40 is provided to communicate authenticating data 20 to and from a currency monitoring system 50. Communicator 40 may include, for example, a modem, digital signal line (DSL), or other well-known telecommunications system, a local area network, wide area network, etc. In one particular example, communicator 40 may include structure similar to communicators provided in well-known credit card authorization systems. While full details of currency monitoring system 50 will be discussed in more detail below, system 50 is capable of authenticating a bill 14 by evaluating authenticating data 20 transmitted thereto from POS terminal 16 by communicator 40. Once currency monitoring system 50 determines whether bill 14 is authentic, communicator 40 receives an authentication response 52. As noted above, authenticity can take a variety of forms. Accordingly, authentication response 52 may include a variety of authenticity indicators. In one embodiment, authentication response 52 may include four types of responses that may be used alone or in combination. First, an "authenticated" response may be used to indicate that bill 14 is authentic and usable; second, a "reject" response may be used to indicate that bill 14 is physically unsuitable for use, e.g., because it is torn, marked, worn, or otherwise unsuitable; third, a "counterfeit" response may be used to indicate bill 14 is suspected to be counterfeit; and fourth, a "stolen" response may be used to indicate that bill 14 is suspected as stolen property. It should be recognized that authentication response 52 may include other types of responses depending on the types of authentication evaluated.

Referring again to FIG. 2, all new US paper currency of 5 dollars ($5) or more now include a thin, plastic authentication strip 104 (hereinafter "strip") embedded therein. Each strip 104 is made of a material that illuminates when exposed to ultraviolet light, and includes a denomination indicator (not shown) of the corresponding bill 14. For example, a strip 104 in a US 20 dollar ($20) bill 14 includes a denomination indicator in the form of repetitive and flipping text reading "USA TWENTY" and a mini-US flag with "20" in the field portion. Other denominations include similar denomination indicators in their respective strips 104.

Figure 4:
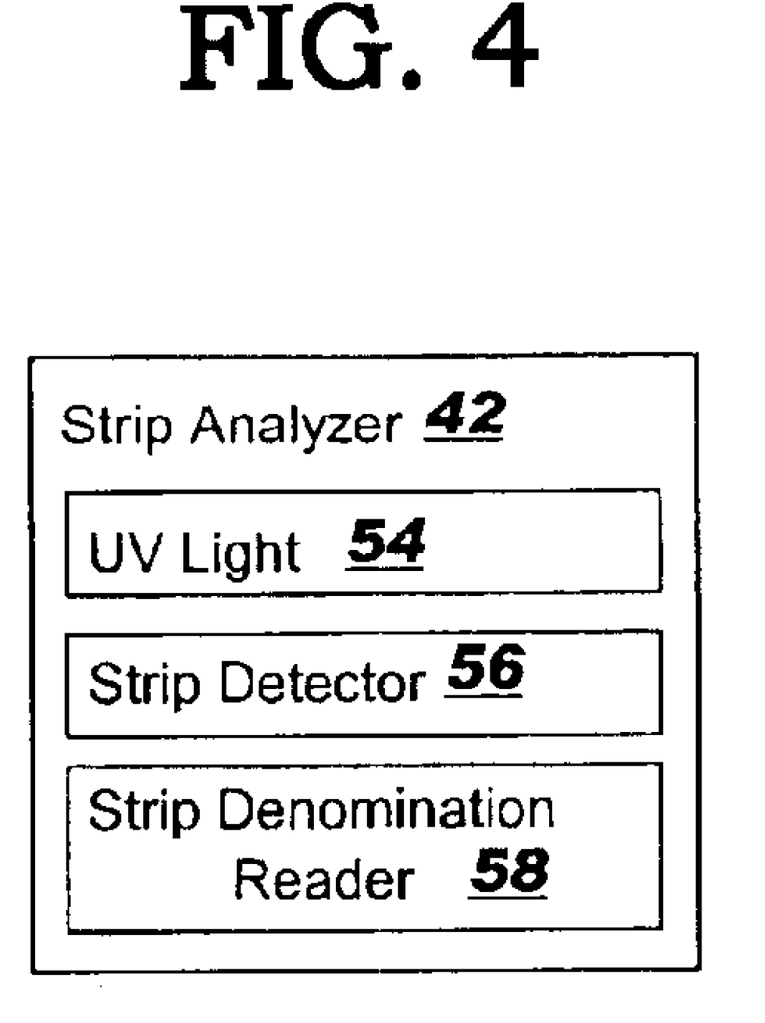
FIG. 4 shows a block diagram illustrating details of the strip analyzer of FIG. 1.

Referring to FIG. 4, a block diagram showing the details of strip analyzer 42 is shown. Strip analyzer 42 is provided to analyze strip 104 (FIG. 2) by detecting whether strip 104 is present and detecting a strip denomination. A "strip denomination," as used herein, is an amount (e.g., FIVE, TEN, USA TWENTY, USA 50, etc.) as indicated on strip 104, and is another form of authenticating data 20. In order to provide this functionality, strip analyzer 42 includes an ultraviolet light 54, a strip illumination detector 56 and a strip denomination reader 58. Ultraviolet light 54 may be any type of device capable of making ultraviolet light sensitive material illuminate, and strip illumination detector 56 may be any type of light sensitive device that can determine when ultraviolet light sensitive material is illuminated. It should be recognized that while strip analyzer 42 is shown as part of authenticator 28, ultraviolet light 54 and strip illumination detector 56 are preferably implemented as part of imager 22. If strip 104 is present, strip illumination detector 56 can sense its presence by its illumination. If strip 104 is not present, bill 14 may be immediately indicated as being non-authentic by authenticator 28. Since older bills, small denomination bills, and many non-US currencies may not have a strip 104, a serial number can be checked to determine whether the missing strip is appropriate, i.e., by checking currency database 86. Strip denomination reader 58 is capable of determining a strip denomination from the denomination indicator thereon. Strip denomination reader 58 may include, for example, an optical character recognition module (not shown) or other image processing device capable of ascertaining the subject matter of the strip denomination indicator on a strip 104. Use of the strip denomination for authentication purposes will be described below.

Comparator 44 is provided to make authenticity determinations by making comparisons between various authenticating data 20. First, comparator can compare a face denomination, as determined by OCR module 34 with a strip denomination, as determined by strip denomination reader 58. If the two amounts do not match, bill 14 is indicated as being non-authentic. Second, in the case that authenticating data 20 includes a plurality of bill serial numbers, e.g., US bill as shown in FIGS. 2 and 3, comparator 44 can determine whether bill serial numbers match each other. If the serial numbers do not match each other, then bill 14 is indicated as being non-authentic.

Since paper currency anti-counterfeiting measures implemented by currency issuing entities vary drastically and new anti-counterfeiting measures are periodically removed, revised or added, the above-described mechanisms for checking bill authenticity are considered only illustrative. Other authenticator(s) 46 that take advantage of different, revised or new measures are also possible. For example, authenticator 28 may include mechanisms for detecting watermarks that are used in many paper currencies, or mechanisms to evaluate a physical state of bill 14 by evaluating bill image(s) 18 to determine whether bill 14 is torn, marked, worn, or otherwise unsuitable for use.

Non-authentication notifier 29 may be provided to communicate an occurrence of bill 14 non-authentication to a governmental authority 70. Governmental authority 70 may include, for example, the US Federal Reserve, US Federal Bureau of Investigation (FBI), state police, local police, foreign market equivalents of the preceding, or a combination thereof. Early notification and quick response is advantageous to instigate tracking paper currency movement and catching criminals.

Other system components 30 may include any now known or later developed mechanisms used for conducting point-of-sale transactions, e.g., a credit-card authorization system, keyboard, monitor(s), bar code reader, receipt printer, etc.

III. Currency Monitoring System

Currency monitoring system 50 ("CMS" in FIG. 1) provides bill 14 authentication by evaluating authenticating data 20 transmitted thereto from POS terminal 16 by communicator 40. In particular, currency monitoring system 50 provides bill 14 authenticating that is not readily completed at POS terminal 16. Currency monitoring system 50 will preferably function at sufficient speed that no unacceptable delays occur at POS terminal 16. For example, currency monitoring system 50 may operate at speeds similar to current credit card authorization systems. Currency monitoring system 50 may be owned/managed by, for example, a government agency such as the US Federal Reserve or the US Treasury, a trusted third party, foreign market equivalents of the preceding, or a combination thereof.

In one embodiment, currency monitoring system 50 includes a communicator 80, an authenticator 82 and an archiver 84. Communicator 80 is provided to communicate certain types of authenticating data 20 to and from currency monitoring system 50, and may include, for example, a modem, digital signal line (DSL), or other well-known telecommunications system, a local area network, wide area network, etc. In one particular example, communicator 80 may include structure similar to communicators provided in well-known credit card authorization systems. Currency monitoring system 50 is also linked to, or includes, a currency database 86. Currency database 86 may be owned/managed by, for example, the US Federal Reserve, the US Treasury, a trusted third party, foreign market equivalents of the preceding, or a combination thereof. Currency database 86 may include practically any data relative to one or more currency issuing entities' currency. For example, currency database 86 may include: all active currency serial numbers for a specific currency issuing entity, serial numbers and/or images of bills reported as stolen and/or known to be counterfeit, serial number and denomination correspondence, and other currency data for one or more currency issuing entities.

Authenticator 82 functions to authenticate bill 14 by conducting at least one evaluation relative to bill 14 using authenticating data 20 and/or currency database 86. In one example, evaluation may include verifying whether a bill's serial number 100 (FIG. 2) is authentic. This verification may be conducted, for example, by a comparator 83 of authenticator 82 comparing bill serial number 100 (FIG. 2), received as authenticating data 20 from POS terminal 16, to all active currency serial numbers for a specific currency issuing entity. If a bill's serial number is not active, it indicates that bill 14 is fraudulent (i.e., non-authentic). In another example, evaluation may include verifying whether a bill denomination corresponds to the bill serial number. That is, whether the serial number is an appropriate number for use on currency of the particular denomination (face and/or strip denomination) for the specific currency issuing entity's currency. If a bill's serial number is not appropriate for the bill's denomination, it indicates that bill 14 is fraudulent (i.e., non-authentic). In another example, authenticator 82 may evaluate a physical state of bill 14 by evaluating bill image(s) 18 to determine whether bill 14 is torn, marked, worn, or otherwise unsuitable for use. This evaluation may be completed, for example, by comparator 83 comparing bill image(s) 18 to an acceptable standard (not shown) to determine whether bill 14 is unsuitable for use.

Once authenticator 82 has completed its evaluation(s), an authentication response 52 may be transmitted back to POS terminal 16 via communicator 80. As described-above, authentication response 52 may include, for example, four types of responses that may be used alone or in combination: "authenticated" to indicate that bill 14 is authentic and usable; "reject" to indicate that bill 14 is physically unsuitable for use; "counterfeit" to indicate bill 14 is suspected to be counterfeit; and "stolen" to indicate that bill 14 is suspected as stolen property. If other evaluations are conducted, authentication response 52 may include other forms of response to represent the findings of those evaluations.

Archiver 84 is provided to allow storage of bill image(s) 18 transmitted to currency monitoring system 50 for such things as long term evaluation, tracking, human expert examination of suspicious bills, etc.

Once again, it should be recognized that because paper currency anti-counterfeiting measures implemented by currency issuing entities vary drastically and new anti-counterfeiting measures are periodically removed, revised or added, the above-described authenticating tasks carried out by currency monitoring system 50 are considered only illustrative. Other authenticator evaluation(s), carried out by authenticator 82, that take advantage of different, revised or new measures are also possible. For example, authenticator 82 may include mechanisms for detecting watermarks that are used in many paper currencies. Furthermore, it should be recognized that although certain authentication tasks have been described as being conducted at POS terminal 16 or currency monitoring system 50, tasks can be completed at either site depending on user preference and communications ability, e.g., POS terminal 16 ability to readily access currency database 86. Accordingly, location of task completion should not be considered absolute.

In addition to the above authentication tasks, currency monitoring system 50 may also be used to update currency database 86. For example, when a bill is removed from circulation and destroyed, currency monitoring system 50 could receive an image of the bill for updating of currency database 86. In this way, the actual bill would no longer need to be returned to the currency issuing entity's treasury department. The bill would be recorded as "inactive" and useless, and the bill could be destroyed locally.

IV. Reconciliation System

As shown in FIG. 1, a reconciliation system 90 for reconciling a POS terminal 16 may be provided as part of merchant site system 36. Reconciliation system 90 may also be provided apart from merchant site system 36, if desired. Reconciliation system 90 includes a communicator 92 and a POS terminal reconciler 94. Communicator 92 may structure similar to communicators 40, 80. Communicator 92 receives authenticating data 20 of bill(s) 14 received at POS terminal 16. In one embodiment, authenticating data 20 includes at least one of bill's serial number 100 (FIG. 2) and bill image 18. POS terminal reconciler 92 reconciles POS terminal 16 by determining whether bill image 18 or serial number 100 (FIG. 2) (or both) of each bill 14 imaged by POS terminal 16 has a corresponding actual bill at specified times. What constitutes a "specified time" may vary. Two common example specified times are: 1) after a specific POS terminal operator's shift ends and the entire drawer of a POS terminal is removed, or 2) when a supervisor periodically removes large denomination bills from a POS terminal. At the specified times, bill image(s) 18 or bill serial numbers that were received by a POS terminal 16 during the specified time are transferred to reconciliation system 90 so that it can determine whether the bills that are supposed to be present (e.g., in the drawer at an end of a shift or in a number of large denomination bills that have been removed) are actually present. Knowledge of bills 14 that are actually present may be provided by manual entry of, for example, bill denominations or serial numbers by a user to reconciling system 90, or by re-imaging and OCR of bills 14 that are present. If, for example, a bill image 18 is present in bill memory 32 for a particular POS terminal 16, but the corresponding bill 18 is not present (e.g., in the drawer of POS terminal 16 after an operator's shift or bills removed from POS terminal), then it indicates theft or loss of a bill, e.g., by a POS terminal 16 operator or supervisor. Note that the POS terminal 16 that received each bill 14 would be known, so that follow-up of any discrepancies can be traced to a respective POS terminal that received the bill.

V. Operation

Figure 5:
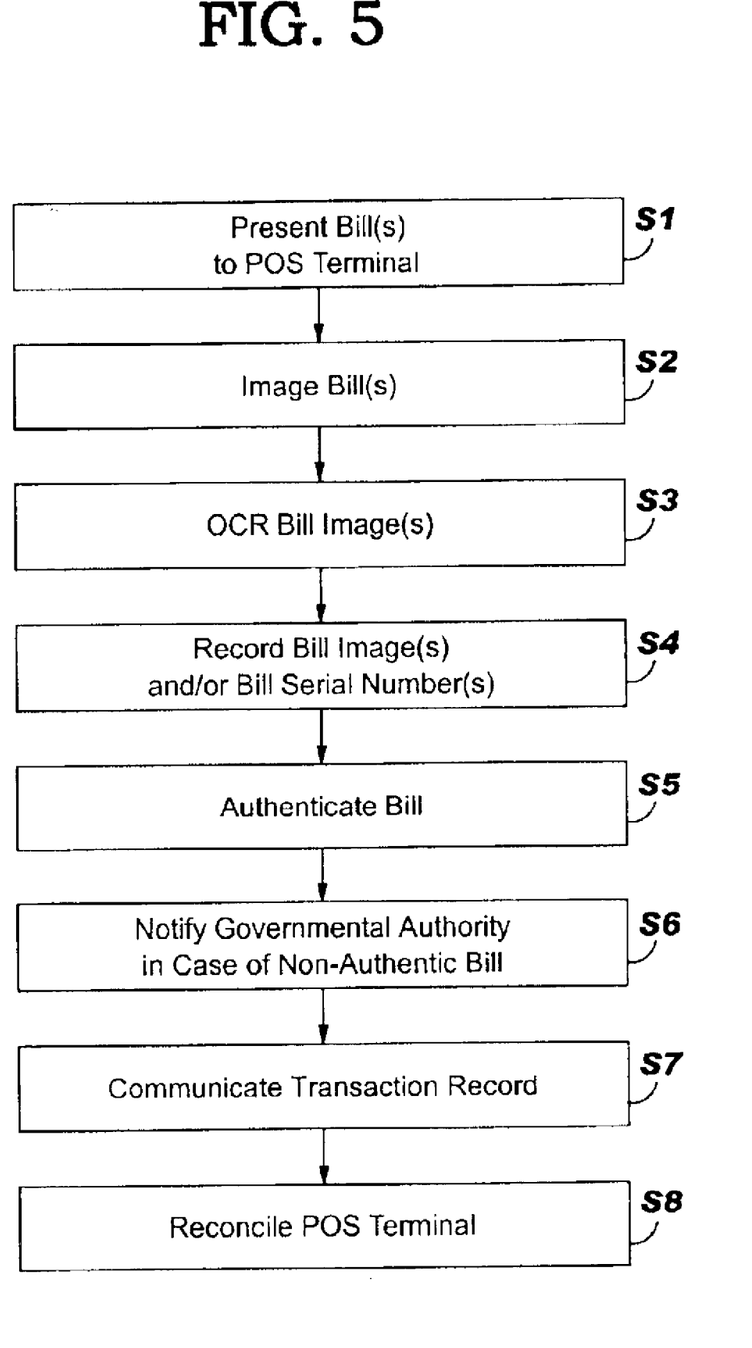
FIG. 5 shows a flow diagram of point-of-sale paper currency authentication according to the invention.

Referring to FIG. 5, operation of the above-described invention will now be described. In step S1, a bill is presented for settlement of a transaction at a POS terminal 16. In step S2, bill 14 is imaged by imager 22 to create a bill image 18. In step S3, bill image 18 is OCRed by OCR module 34 to determine bill authentication data 20, e.g., at least one of a face denomination and at least one serial number, etc. Step S4 represents an optional step of recording bill image(s) 18 received using bill recorder 24 to create a bills record 25. Step S4 may also optionally record bill image(s) 18 given back to the customer as change using bill recorder 24 to create a more complete bills record 25 and/or transaction record 27. In step S5, authentication of bill 14 is carried out by authenticator 28 in real time. Authentication includes conducting at least one of: a) communicating bill authenticating data 20 to a currency monitoring system 50 that evaluates bill authenticity, and awaiting an authentication response 50 to POS terminal 16; b) exposing bill 14 to ultraviolet light 54 at POS terminal 16 to determine whether an authentication strip 104 (FIGS. 2 and 3) is present in bill 14, wherein strip 104 is illuminated by ultraviolet light 54; c) determining, in the case that authenticating data 20 includes a plurality of bill serial numbers 100A, 100B (FIG. 2), whether the bill serial numbers match each other; and d) determining a first (face) denomination from the OCR step and a second (strip) denomination from authentication strip 104 (FIGS. 2 and 3) at POS terminal 16, and determining whether the first and second denominations match.

With further regard to the communicating step, the step may further include communicating bill images 18 of at least one of a front (FIG. 2) and a back (FIG. 3) of bill 14 to currency monitoring system 50, e.g., for archiving by archiver 84. In addition, when the communicating step is used, currency monitoring system 50 may carry out authentication by verifying at least one of: a) whether the at least one serial number is an active serial number, and b) whether the at least one serial number corresponds to the bill's denomination. As noted above, currency monitoring system 50 may be at least one of a government agency and a trusted third party. As also noted above, an authentication response 52 may include responses of the types: authenticated, rejected, counterfeit or stolen.

Steps S6–S8 represent optional steps. Step S6 includes notifying a governmental authority 70 in the case that bill 14 is not authentic. Step S7 includes communicating a transaction record 27 of bill 14 to a cash presenter, i.e., customer 12. Step S8 includes reconciling POS terminal 16 by determining whether at least one of bill image 16 and a bill serial number 100 (FIG. 2) of each bill imaged by POS terminal 16 has a corresponding actual bill present at a specified time.

VI. Conclusion

In the previous discussion, it will be understood that the method steps discussed are performed by a processor, such as processor of POS terminal, executing instructions of program product stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method of authenticating a bill at a point-of-sale terminal, the method comprising the steps of:
    imaging a bill presented for payment at the point-of-sale terminal to create a bill image;
    conducting optical character recognition on the bill image to determine bill authenticating data;
    determining whether the bill is authentic in real-time by:
        communicating the bill authenticating data to a currency monitoring system that evaluates bill authenticity by comparing the bill authenticating data to a currency database including a list of stolen bills to determine whether the bill was stolen, and awaiting an authentication response to the point-of-sale terminal; and
        reconciling the point-of-sale terminal by inputting at least one of a bill image and bill authenticating data of each actual bill present at a specific time and determining whether at least one of the bill image and the bill authenticating data of each bill imaged by the point-of-sale terminal has a corresponding actual bill present at the specified time based on the inputting.

2. The method of claim 1, wherein the bill authenticating data includes at least one of: a bill image, a bill denomination and at least one bill serial number.

3. The method of claim 1, wherein the communicating step further includes communicating images of a front and a back of the bill to the currency monitoring system.

4. The method of claim 2, wherein the currency monitoring system verifies at least one of; a) whether the at least one serial number is an active serial number, and b) whether the at least one serial number corresponds to the bill denomination.

5. The method of claim 1, wherein the currency monitoring system is at least one of a government agency and a trusted third party.

6. The method of claim 1, wherein the authentication response is one of: authenticated, rejected, counterfeit and stolen.

7. The method of claim 1, further comprising the step of notifying a governmental authority in the case that the bill is not authentic.

8. The method of claim 1, further comprising the step of communicating a transaction record of the bill to a cash presenter.

9. A point-of-sale terminal comprising:
    means for imaging a bill presented for payment at the point-of-sale terminal to create a bill image;
    means for determining bill authenticating data;
    means for authenticating the bill in real-time by communicating the bill authenticating data to a currency monitoring system that evaluates bill authenticity by comparing the bill authenticating data to a currency database including a list of stolen bills to determine whether the bill was stolen, and awaiting an authentication response to the point-of-sale terminal; and
    means for communicating the bill authenticating data to a means for reconciling the point-of-sale terminal by inputting at least one of a bill image and bill authenticating data of each actual bill present at a specified time and determining whether at least one of the bill image and the bill authenticating data of each bill imaged by the point-of-sale terminal has a corresponding actual bill present at the specified time based on the inputting.

10. The point-of-sale terminal of claim 9, wherein the means for authenticating includes means for exposing the bill to ultraviolet light at the point-of-sale terminal to determine whether an authentication strip is present in the bill, wherein the authentication strip is illuminated by the ultraviolet light.

11. The point-of-sale terminal of claim 9, wherein the means for determining includes means for conducting optical character recognition on the bill image.

12. The point-of-sale terminal of claim 11, wherein the means for authenticating includes means for determining, in the case that the authenticating data includes a plurality of bill serial numbers, whether the plurality of bill serial numbers match each other.

13. The point-of-sale terminal of claim 11, wherein the means for conducting optical character recognition determines a first denomination of the bill; and the means for authenticating further includes:
    means for determining a second denomination of the bill from the authentication strip at the point-of-sale terminal, and
    means for determining whether the first and second denominations match.

14. The point-of-sale terminal of claim 9, wherein the bill authenticating data includes at least one of: a bill image, a bill denomination and at least one bill serial number.

15. The point-of-sale terminal claim 9, wherein the means for authenticating further communicates at least one of a front image and a back image of the bill to the currency monitoring system.

16. The point-of-sale terminal claim 9, wherein the currency monitoring system verifies at least one of: a) whether the at least one serial number is an active serial number, and b) whether a bill serial number corresponds to a bill denomination.

17. The point-of-sale terminal claim 9, wherein the currency monitoring system is at least one of a government agency and a trusted third party.

18. The point-of-sale terminal claim 9, wherein the authentication response is one of authenticate, reject, counterfeit and stolen.

19. The point-of-sale terminal claim 9, wherein the means for authentication further includes means for notifying a governmental authority in the case that the bill is not authentic.

20. The point-of-sale terminal claim 9, further comprising means for presenting a transaction record of the bill to a cash presenter.

21. A currency monitoring system for a bill received at a point-of-sale terminal, the system comprising:

means for receiving authenticating data regarding the bill means for authenticating the bill including verifying that the bill is not stolen by comparison of the authenticating data to a currency database including data on bills reported as stolen;

reconciling the point-of-sale terminal by inputting at least one of a bill image and bill authenticating data of each actual bill present at a specified time and determining whether at least one of the bill image and the bill authenticating data of each bill imaged by the point-of-sale terminal has a corresponding actual bill present at the specified time based on the inputting.

22. The currency monitoring system of claim 21, wherein the authenticating data includes at least one image of the bill, and further comprising means for archiving the at least one image of the bill.

23. A system for reconciling a point-of-sale terminal, the system comprising:

means for receiving a bill image of a bill received at the point-of-sale terminal; and means for reconciling the POS terminal by inputting at least one of a bill image and bill authenticating data of each actual bill present at a specified time and determining whether at least one of the bill image and a serial number of each bill imaged by the POS terminal has a corresponding actual bill present at the specified time based on the inputting.

24. A computer program product comprising a computer useable medium having computer readable program code embodied therein for authenticating a bill at a point-of-sale terminal, the program product comprising:

program code configured to authenticate the bill in real-time by communicating bill authenticating data, obtained by conducting optical character recognition on an image of the bill, to a currency monitoring system, and awaiting an authentication response to the point-of-sale terminal as to whether the bill was reported as stolen, which is determined by comparing the bill authenticating data to a currency database including a list of stolen bills; and program code configured to reconcile the point-of-sale terminal by inputting at least one of a bill image and bill authenticating data of each actual bill present at a specified time end determining whether at least one of the bill image and the bill authenticating data of each bill imaged by the point-of-sale terminal has a corresponding actual bill present at the specified time based on the inputting.

25. The computer program product of claim 24, further comprising program code configured to conduct optical character recognition of the image of the bill to determine a first denomination of the bill.

* * * * *